United States Patent [19]

Garcia-Mallol et al.

[11] 4,419,965
[45] Dec. 13, 1983

[54] FLUIDIZED REINJECTION OF CARRYOVER IN A FLUIDIZED BED COMBUSTOR

[75] Inventors: Juan A. Garcia-Mallol, Morristown; Michael G. Alliston, Newark, both of N.J.

[73] Assignee: Foster Wheeler Energy Corporation, Livingston, N.J.

[21] Appl. No.: 321,518

[22] Filed: Nov. 16, 1981

[51] Int. Cl.³ .............................................. F22B 1/02
[52] U.S. Cl. ................................. 122/4 D; 110/245; 110/263; 431/170
[58] Field of Search ................ 122/4 D; 431/170, 7; 110/263, 245; 165/104.16

[56] References Cited

U.S. PATENT DOCUMENTS

| | | | |
|---|---|---|---|
| 3,508,506 | 4/1970 | Bishop | 122/4 D |
| 3,902,462 | 9/1975 | Bryers | 122/4 D |
| 3,905,336 | 9/1975 | Gamble et al. | 122/4 D |
| 4,084,545 | 4/1978 | Nack et al. | 122/4 D |
| 4,227,488 | 10/1980 | Stewart et al. | 122/4 D |
| 4,312,301 | 1/1982 | Anson | 122/4 D |
| 4,325,327 | 4/1982 | Katesaria et al. | 122/4 D |
| 4,355,601 | 10/1982 | Hattiangadi | 122/4 D |

Primary Examiner—Edward G. Favors
Attorney, Agent, or Firm—Marvin A. Naigur; John E. Wilson; Warren B. Kice

[57] ABSTRACT

A system for the fluidized reinjection of fine particles (carryover) into a fluidized bed combustor. The carryover recirculation system includes a fluidized reinjection bed which is fluidized using clean gas from the induced draft fan outlet boosted by a small auxiliary fan. The fluidized fine particles can be reinjected into the fluidized combustor bed by either dense phase transport or by dilute phase transport.

10 Claims, 5 Drawing Figures

FLUIDIZED REINJECTION OF CARRYOVER IN A FLUIDIZED BED COMBUSTOR

BACKGROUND OF THE INVENTION (1) Field of the Invention

The invention is in the field of atmospheric fluidized bed combustion systems. More particularly, the invention relates to a solids recirculation system for the fluidized reinjection of carryover into a fluidized bed combustor.

(2) Description of the Prior Art

In one prior art fluidized bed combustor unit, carryover recirculation for the fluidized bed combustor is accomplished by using an air eductor system feeding a pneumatic transport line. The eductor type system operates on a venturi principle and transfers the carryover particles by drawing them from a cyclone collect hopper. Such a system is in use in the fluidized bed combustion system installed at Georgetown University in Washington, D.C.

The air eductors accomplish the dual function of building up the pressure to the combustor fluidized bed height level and providing the air for the pneumatic transport of the solid material. However, the air eductors require a very high energy jet, which upon dissipation results in high abrasion rates even for the special materials employed. Furthermore, the bulk type of flow for the solid material upstream of the air eductor and the configuration of the air eductor's axis with respect to the flow of the material make pluggage likely.

SUMMARY OF THE INVENTION

It is therefore an object of the present invention to provide a reliable and energy efficient carryover recirculation system for a fluidized bed combustor.

Towards the fulfillment of this and other objects, the carryover recirculation system of the present invention includes a fluidized reinjection bed which is fluidized with clean gas from the induced draft fan outlet boosted by a small auxiliary fan.

The system is designed to allow the carryover material to return to the combustor under the force of its own weight, by letting the carryover collect in a seperate fluidized bed whose differential pressure relative to the combustor bed will be sufficient to compensate for the losses through the reinjection lines discharging at the bottom of the combustor bed. When compared with the air eductor type system, the present fluidized reinjection system requires about two orders of magnitude less power than the eductors require and the lower velocities throughout the system practically eliminate the problem of abrasion. Furthermore, the present system regulates itself in operation.

DESCRIPTION OF THE PREFERRED EMBODIMENTS

Figure 1:
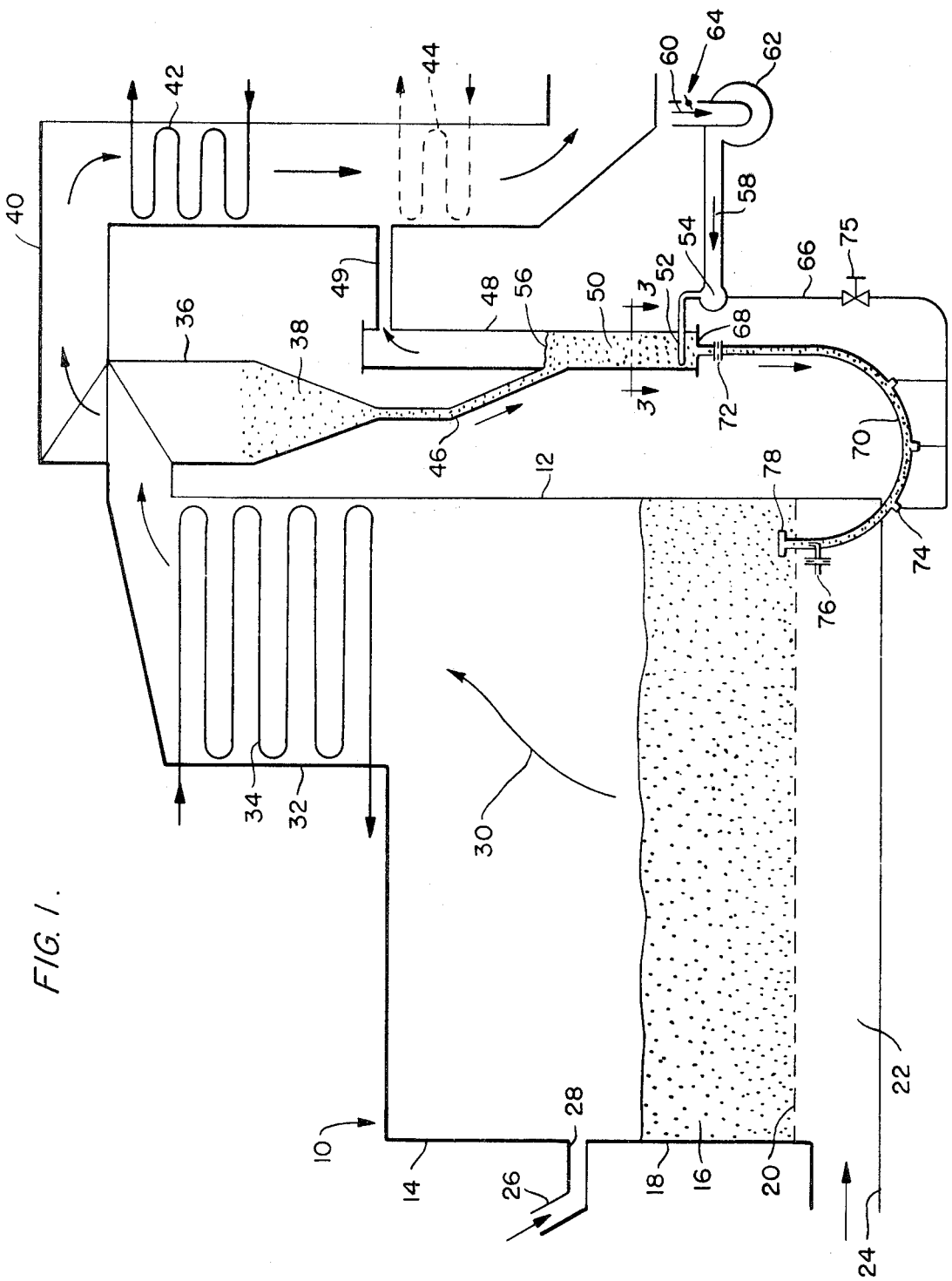
FIG. 1 is a schematic sectional view depicting one embodiment of the present invention using aeration gas to achieve dense phase reinjection.
Figure 2:
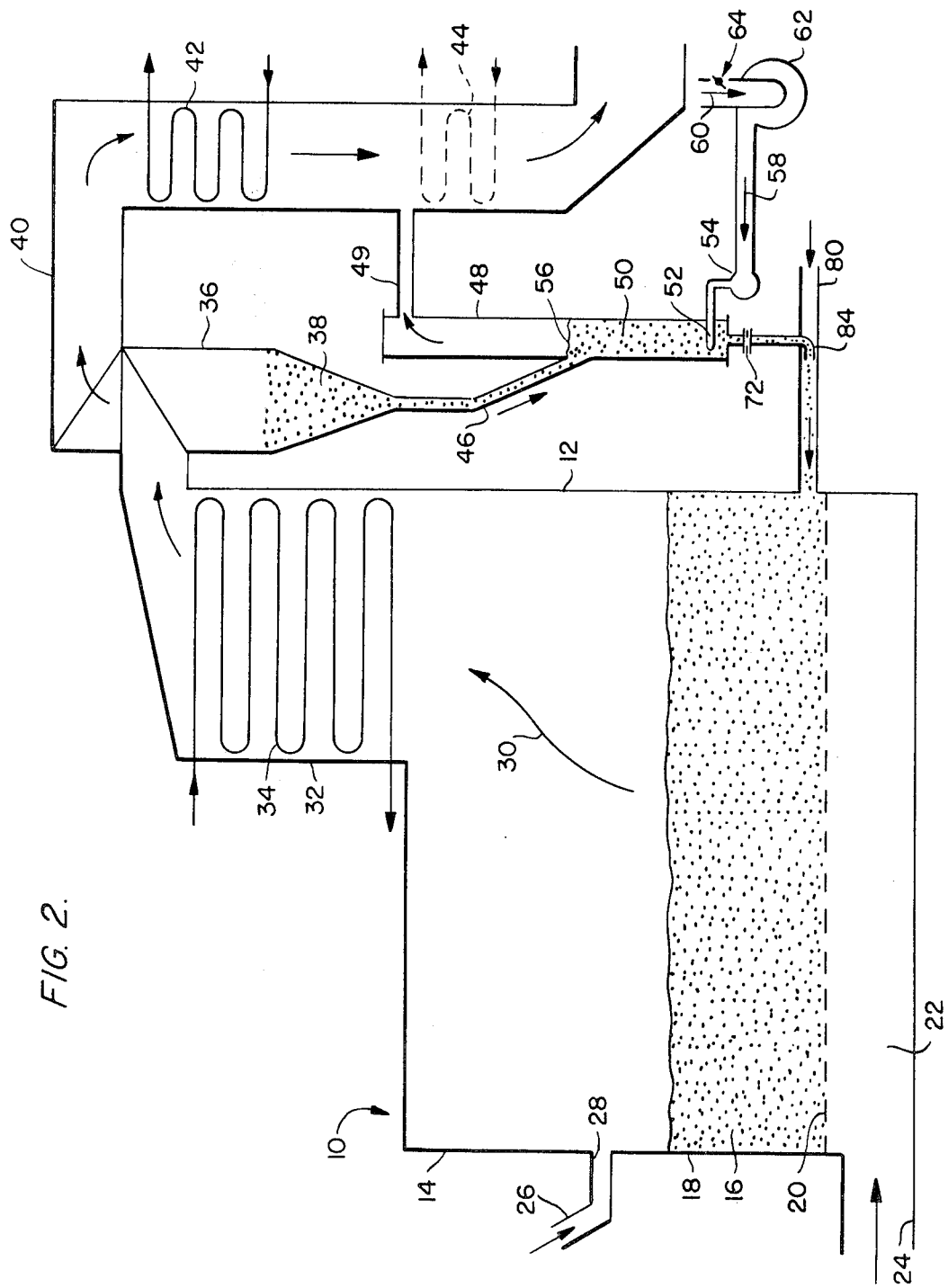
FIG. 2 is a schematic sectional view depicting an alternative embodiment of the present invention using pneumatic transport air to achieve dilute phase reinjection.

Referring specifically to FIGS. 1 and 2 of the drawings, the reference numeral 10 refers in general to a pilot plant atmospheric fluidized bed combustor unit chosen for the purpose of illustrating the principles of the invention. The application of the principles of the invention to a commercial combustion system (e.g., a boiler or steam generator or similar type device) is considered to be part of the invention and would be routine to a person of ordinary skill in the art given the description herein.

The combustor 10 has a front wall 12, a rear wall 14, and two sidewalls (not shown). Each wall is lined with a refractory material, it being understood that a commercial combustion system embodying the invention could have a means for heating water or generating steam, such as a water wall enclosure, in pipe of the refractory material.

A fluidized bed of particulates material, maintained at approximately atmospheric pressure, is shown in general by reference numeral 16. The bed 16 is disposed within a combustion chamber 18 and is supported by an air distribution plate 20 extending horizontally in the lower portion of the unit. The bed 16 can consist of discrete particles of fuel material such as coal, an adsorbent (e.g., limestone or dolomite particles) for the capture of sulfur oxides (SOx) released during combustion of the fuel material, and recirculated fine particles (carryover) which largely consist of fragments of unburned fuel material and adsorbent material.

An air plenum 22 is provided immediately below the plate 20 and an air inlet 24 is provided through the rear wall in communication with the plenum 22. Air for the combustion of the fuel and for fluidizing the bed 16 is provided to the plenum 22 from the forced draft fan (not shown) through the air inlet 24.

An overbed fuel feeder pipe 26 is provided in communication with a feeder port 28 in rear wall 14. The feeder pipe 26 receives particulate coal from an external supply and is adapted to feed the coal particles through the feeder port 28 into the bed 16 in a conventional manner such as by pneumatic conveyance. The quantity of fuel supplied to the bed 16 is controlled by a flow valve (not shown) suitably mounted in the feeder pipe. It is understood that multiple feeder pipes can also be provided through one or more of the front wall 12, the rear wall 14, and the side walls. Optionally, a plurality of in-bed feeders may be provided in lieu of the overbed feeders. A drain pipe (not shown) is provided through the plate 20 in communication with the bed 16 to withdraw spent fuel material, primarily in the form of ashes, from the bed.

It is understood that one or more conventional in-bed cooling coils (not shown) would normally be disposed in the bed 16, and would extend into the bed through one of the walls. Water or other fluid is passed through the coils to cool the temperature of the bed and to add heat to the water.

The heated air, after passing through the fluidized bed 16, flows upwardly as combustion gases 30 into a duct 32 where the hot gases flow past and exchange heat with gas cooling coil 34 which also contains water or other fluid. The combustion gases 30 contain entrained fine particles (carryover) which consist mainly of fragments of unburned fuel material and adsorbent material.

After passing through duct 32, the combustion gases 30 are directed to a cyclone type dust collector 36 which partially removes the fine particles 38 entrained in the gases. The gases 30 with the fines thus removed are then passed, via duct 40, through gas cooling coil 42 and gas cooling coil 44 (optional) in a heat exchange relationship. The gases then pass to the baghouse (not shown) where they are further filtered and cleaned. The gases are drawn through the baghouse by an induced draft fan (not shown) which also serves to force the clean gases out through the exhaust stack.

The fine particles 38 collected in the cyclone 36 pass downwardly through the cyclone leg 46 into a reinjection fluidized bed chamber 48 where the fine particles 38 form a reinjection fluidized bed 50. The bed 50 is fluidized by the action of air injected upwardly into the chamber 48 by the sparger pipes 52 which are shown in more detail in FIG. 3. Alternatively, a perforated air distribution grid plate may be used in lieu of the sparger pipes.

Figure 3:
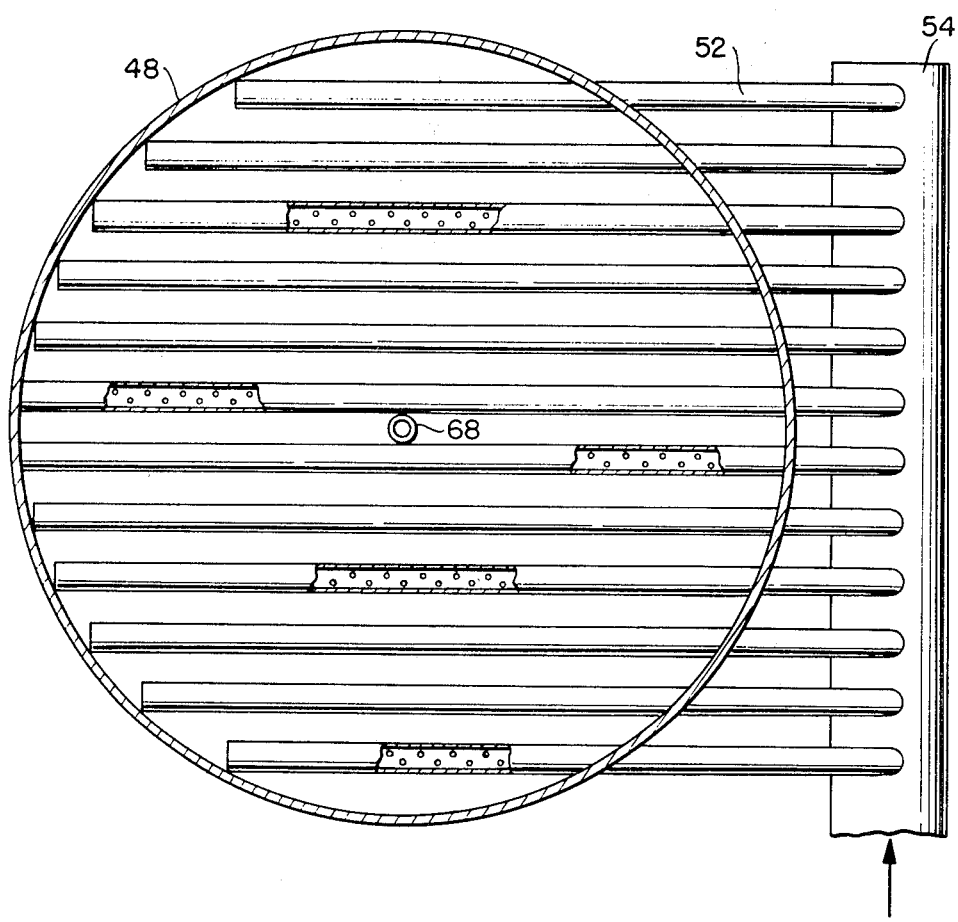
FIG. 3 is an enlarged sectional view taken along line 3—3' in FIG. 1 and it shows one embodiment of the recirculation bed chamber having air sparger pipes located in the lower portion of the chamber. Portions of the sparger pipes are shown broken away to illustrate the spaced apart holes in the lower sides of the sparger pipes.

As shown in FIG. 3, the fluidizing air enters a header 54 which feeds the multiple sparger pipes 52 located horizontally in the lower portion of the reinjection fluidized bed chamber 48. The sparger pipes 52 have spaced apart holes in their lower side which admit the fluidizing air in the chamber 48 thereby fluidizing the fine particles 38. The design of a grid plate or sparger pipe system for fluidization is based primarily on the requirement that the pressure drop across the grid or sparger pipes should be at least 30% of the bed backpressure. Assuming that the combustor bed and the reinjection bed air distribution grids are at the same level, the reinjection bed balance height is that height which, when both beds are static, gives the same solids pressure as the combustor bed.

The fluidizing air 58 is provided by clean gas 60 from the induced draft fan outlet boosted by a small auxiliary fan and motor 62. During startup procedures, ambient air may be admitted through damper 64 to avoid adding high amounts of water vapor to the cold bed 50 by the gas 60 from the induced draft fan. The fluidizing air 58 passes from fan 62 to the header 54 where the air then goes into the sparger pipes 52. The aeration gas line 66 also is fed from header 54 and is connected to the bottom thereof.

The fine particles 38 pass down and then out of the chamber 48 through the drain 68 located in the bottom of the chamber 48. One or more reinjection lines 70 carry the fine particles from the drain 68 to the fluidized combustion bed 16. Each reinjection line 70 is provided with an adjustable orifice 72 which may be adjusted to balance the flow of fine particles through each line by equalizing the back pressure in each. In this embodiment, the fine particles 38 flow through each reinjection line in a dense phase. The particles are kept in a fluidized state by aeration gas fed into each reinjection line 70 at multiple points through aeration taps 74. The flow of the aeration gas in line 66 is controlled by a manual needle valve 75.

Solids flow through the reinjection lines 70 is accomplished by the differential pressure between the reinjection bed 50 and the combustor bed 16. The gas velocity will be about twice the solids velocity. For 10,000 lb/hr solids flow at 28.4 lb/ft$^3$ through three 2" ID reinjection lines (0.065 ft.$^2$), the solid velocity is 1.5 fps. Thus, the aeration gas requirement is 12 CFM.

To assist in feeding the fine particles into the combustor fluidized bed 16 through the reinjection nozzles 78, each reinjection line 70 is also provided with a dilution air inlet 76 which injects additional transport air in the portion of the lines where the solids are flowing upward toward the combustor bed. The air is taken directly from the plenum 22. From this injection point on, pneumatic transport will take place. The fine particles pass out the T-shaped reinjection nozzle 78 into the fluidized bed 16 where they undergo further reaction.

The embodiment shown in FIG. 1 is suitable for installations where the distance between the dust collector and the combustor allows for dense phase transport. Dense phase solids transfer is practical if the distance between the recirculation chamber 48 and the combustor bed 16 is small enough to allow the reinjection lines 70 to be formed in a smooth "U" bend.

In the event that the distance between the recirculation chamber 48 and the combustor bed 16 is too great for dense phase solid transport, then the embodiment shown in FIG. 2 using pneumatic transfer of solids is employed. For pneumatic transport with horizontal runs, the gas velocity through the reinjection lines must be greater than the saltation velocity, when all solid particles will be in stable entrainment in the gas. This gas will normally be air. Due to the small residence time of the solids and to temperature quenching, there is no problem due to combustion.

The embodiment of FIG. 2 is similar to that of FIG. 1 and identical components are given the same reference numerals. In the embodiment of FIG. 2, the fluidizing air 58 enters header 54 which is connected to the sparger pipes 52. There is also a pneumatic transport air feed line 80. The pressurized air for transport line 80 may be supplied from the forced draft fan or from the induced draft fan outlet boosted by auxiliary fan and motor 62. A reinjection feed line 72 is inserted within the pneumatic transport line 80 to form pneumatic pickup point 84. The fine particles 38 travel horizontally inside transport line 80 in dilute phase and are injected directly into combustor fluidized bed 16 as shown in FIG. 2. Alternatively, reinjection nozzles similar to those shown in FIG. 1 can be employed in this embodiment. In that situation, pneumatic transport line 80 would enter vertically into the combustor fluidized bed 16.

Figure 4:
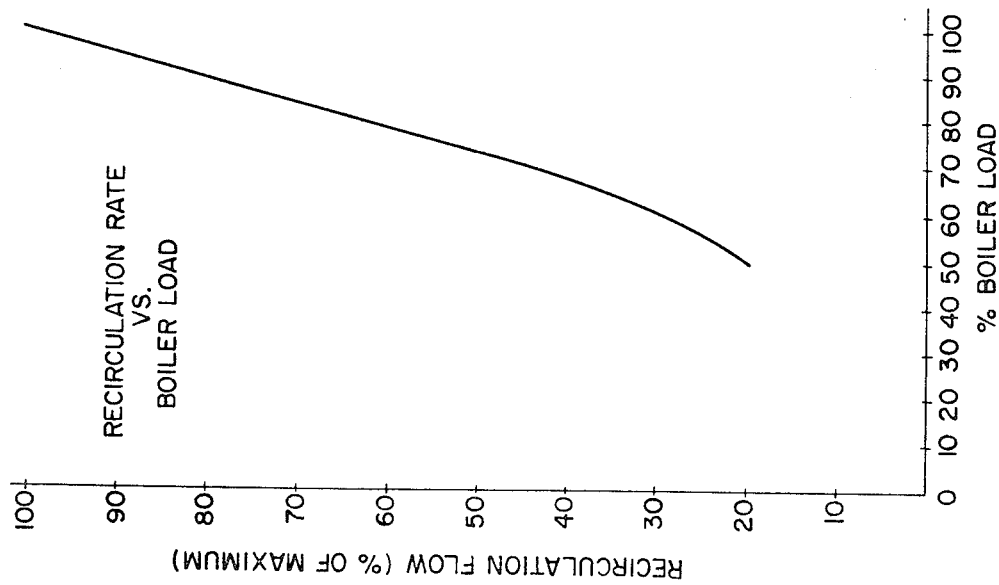
FIG. 4 is a graph showing the generally applicable solids recirculation rate as a function of boiler load from 50% to 100% boiler load.

FIG. 4 shows the generally applicable solids recirculation rate, as a function of boiler load from 50% to 100% boiler load. This curve was determined by assuming that turndown is achieved without segment or bed slumping, so that there is an increase in the fraction of fines of the size that affects cyclone efficiency in the carryover when fluidizing velocity is decreased. A reduction in cyclone efficiency with a reduction in fluidizing velocity was also recognized, in order to take into consideration the decrease in draft loss across the cyclone that accompanies a reduction in fluidizing velocity. For the example case, a high ash fuel fired in a 50 MM BTU/hr output unit, 100% recirculation is taken as 10,166 lb/hr, which is approximately twice the normal rate.

Figure 5:
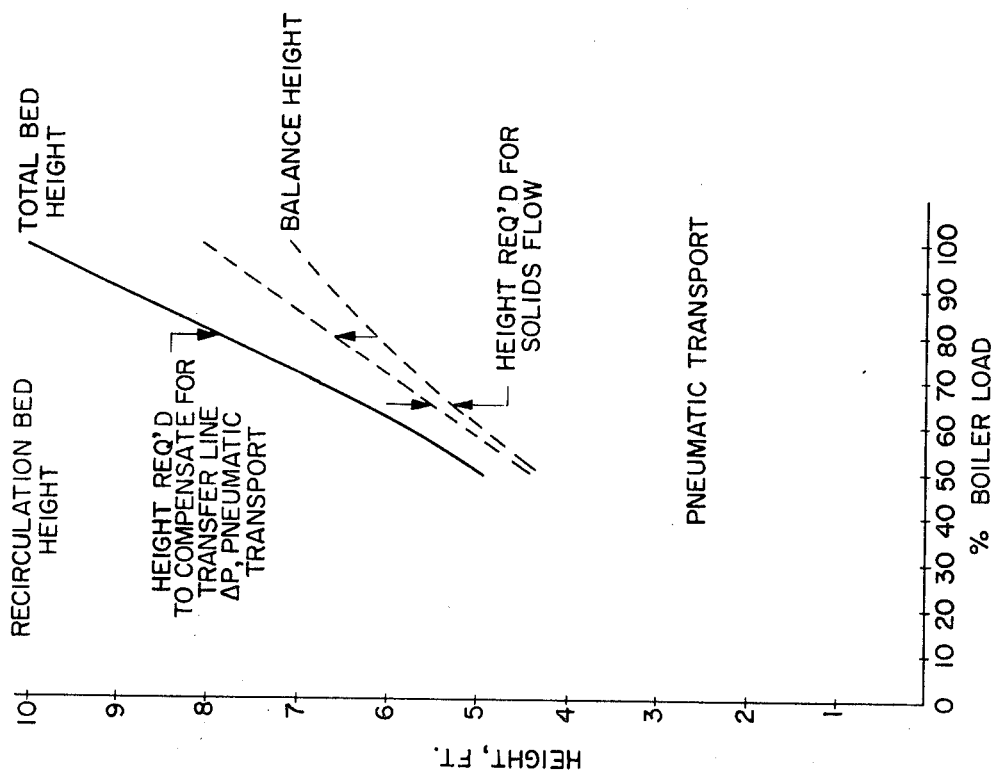
FIG. 5 is a graph showing the variation in the recirculation bed height as a function of boiler load when using the pneumatic transport embodiment shown in FIG. 2.

FIG. 5 shows the variation in the recirculation bed height as a function of boiler load which will occur with the pneumatic transport arrangement of FIG. 2. In FIG. 5, it was assumed that the recirculation bed height is no more than 10 ft. at the maximum solids recirculation rate. It was further assumed that the fluidized recirculation bed density is 28.4 lb/ft$^3$ and that the bed backpressure is 284 lb/ft$^2$.

As indicated above, the present fluidized solids recirculation system is an improvement over the air eductor system which transfers solids by drawing solid particles from a cyclone collect hopper, but requires a relatively large volume of air at a high pressure. For example a single air eductor will require 100 SCFM air at 18 psig for 0.5 CFM solids transport. Thus, for 10,000 lb/hr solids flow, and a solids bulk density of 40 lb/ft$^3$, nine eductors will be required. An air compressor delivering 900 SCFM at 18 psig will require about 75 HP, considering 68% compressor efficiency. The following table, based upon a 10,000 lb/hr recirculation flow, will aid in comparing the fluidized reinjection system of the present invention with the eductor system.

|  | No. of Lines | Gas Flow (CFM) | Pressure (PSI) | Required Power (HP) |
| --- | --- | --- | --- | --- |
| Fluidized Recirculation | 3 | 176 | 2.2 | 2.03 |
| Eductors | 9 | 900 | 18 | 75 |

The above-described embodiments are intended to be illustrative, not restrictive. The full scope of the invention is defined by the claims, and any and all equivalents are intended to be embraced.

What is claimed is:

1. A fluidized bed combustion system comprising:
   (a) a combustion chamber;
   (b) means in said combustion chamber for supporting a bed of particulate material including a fuel material;
   (c) means for providing and introducing air to said bed, to fluidize said particulate material and to promote the combustion of said fuel material;
   (d) means for introducing fuel to said bed of particulate material;
   (e) separating means in communication with said combustion chamber for separating said combustion gases from said fine particles;
   (f) means in communication with said separating means for receiving said fine particles from said separating means and for supporting a bed of said fine particles;
   (g) a header and a set of horizontally-extending sparger pipes having spaced apart holes in their lower sides for introducing air to said fine particles to fluidize said fine particles; and
   (h) means for passing said fine particles in a fluidized state from said bed of fine particles to said bed of particulate material.

2. A fluidized bed combustion system comprising:
   (a) a combustion chamber;
   (b) means in said combustion chamber for supporting a bed of particulate material including a fuel material;
   (c) means for providing and introducing air to said bed, to fluidize said particulate material and to promote the combustion of said fuel material;
   (d) means for introducing fuel to said bed of particulate material;
   (e) separating means in communication with said combustion chamber for separating said combustion gases from said fine particles;
   (f) means in communication with said separating means for receiving said fine particles from said separating means and for supporting a bed of said fine particles;
   (g) means for providing and introducing gas to said latter bed to fluidize said fine particles;
   (h) first conduit means for conveying said fine particles in a fluidized state from said bed of fine particles, said first conduit means extending from said bed of fine particles to said first fluidized bed, said first conduit means further including multiple aeration taps located along its length;
   (i) a second conduit means for conveying gas under pressure into said aeration taps to convey said fine particles through said first conduit means in a dense phase fluidized state; and
   (j) means for injecting said fine particles from said conveying means into said first fluidized bed.

3. A fluidized bed combustion system comprising:
   (a) a combustion chamber;
   (b) means in said combustion chamber for supporting a bed of particulate material including a fuel material;
   (c) means for providing and introducing air to said bed, to fluidize said particulate material and to promote the combustion of said fuel material;
   (d) means for introducing fuel to said bed of particulate material;
   (e) separating means in communication with said combustion chamber for separating said combustion gases from said fine particles;
   (f) means in communication with said separating means for receiving said fine particles from said separating means and for supporting a bed of said fine particles;
   (g) means for providing and introducing gas to said latter bed to fluidize said fine particles; and
   (h) first conduit means for conveying said fine particles in a fluidized state from said bed of fine particles to said first fluidized bed;
   (i) a second conduit means for conveying gas under pressure, said second conduit means being connected to said first conduit means and forming a pneumatic pickup point, whereby said first conduit means feeds said fine particles into said second conduit means and said fine particles are conveyed in said second conduit means in a dilute phase state; and
   (j) means for injecting said fine particles from said conveying means into said first fluidized bed.

4. A fluidized bed combustion system comprising:
   (a) a combustion chamber;
   (b) means in said combustion chamber for supporting a bed of particulate material including a fuel material;
   (c) means for providing and introducing air to said bed to fluidize said particulate material and to promote the combustion of said fuel material;
   (d) means for introducing fuel to said bed of particulate material;

(e) separating means in communication with said combustion chamber for separating said combustion gases from said fine particles;

(f) means in communication with said separating means for receiving said fine particles from said separating means and for supporting a bed of said fine particles;

(g) means for providing and introducing gas to said latter bed to fluidize said fine particles;

(h) means for conveying said fine particles in a fluidized state from said bed of fine particles; and (i) a T-shaped nozzle located within said bed of particulate material for injecting said fine particles from said conveying means into said bed of particulate material.

5. The system of claims 1, 2, 3, or 4 further comprising duct means located above said combustion chamber and in communication therewith for receiving the combustion gases containing entrained fine particles from said bed and conveying said fine particles to said separating means.

6. The system of claim 1, 2, 3, or 4 wherein said separating means is a cyclone separator.

7. The system of claim 1, 2, 3, or 4 wherein said means for introducing air to said bed of fine particles is a horizontally-extending grid plate.

8. The system of claim 1, 2, 3, or 4 further comprising means for passing water in a heat exchange relation to said combustion chamber and to said duct means to add heat to said water.

9. The system of claim 1, 2, 3, or 4 wherein said fuel material is coal.

10. The system of claim 1, 2, 3, or 4 wherein said bed of particulate material includes limestone or dolomite particles for the capture of sulfur oxides (SOx).

* * * * *